United States Patent [19]

Obidin

[11] Patent Number: 4,947,894
[45] Date of Patent: Aug. 14, 1990

[54] FLOW AMPLIFIER IN HYDRAULIC STEERING SYSTEM OF A TRANSPORT VEHICLE

[75] Inventor: Valery Y. Obidin, Moscow, U.S.S.R.

[73] Assignee: Nauchno-Proizvodstvennoe Obiedinenie, U.S.S.R.

[21] Appl. No.: 801,802

[22] Filed: Nov. 26, 1985

[51] Int. Cl.[5] .......................................... F15B 13/042
[52] U.S. Cl. .................................. 137/625.66; 60/384; 91/6; 91/31; 180/132
[58] Field of Search ....................... 60/384; 91/6, 31; 180/132; 137/625.66

[56] References Cited

U.S. PATENT DOCUMENTS 4,356,759 11/1982 Ljubimov et al.

OTHER PUBLICATIONS

Prospectus of Danfoss Co., Denmark, No. 6/82-02, 1982.

*Primary Examiner*—Gerald A. Michalsky
*Attorney, Agent, or Firm*—Ladas & Parry

[57] ABSTRACT

A flow amplifier in the hydraulic steering system of a transport vehicle comprises a three-position hydraulically operated hydraulic directional control valve having a single sliding spool valve and internal hydraulic pilot lines connected, when in the crossover position, to external portholes made in a sleeve of the three-position hydraulically operated hydraulic directional control valve provided with plungers spring-loaded on their outside end faces. The flow amplifier incorporates also a pair of intensifying chokes, a air of pilot chokes, and a pair of regulating chokes made in the sliding spool valve with a possibility of varying their restriction areas along the direction of travel of the sliding spool valve.

2 Claims, 1 Drawing Sheet

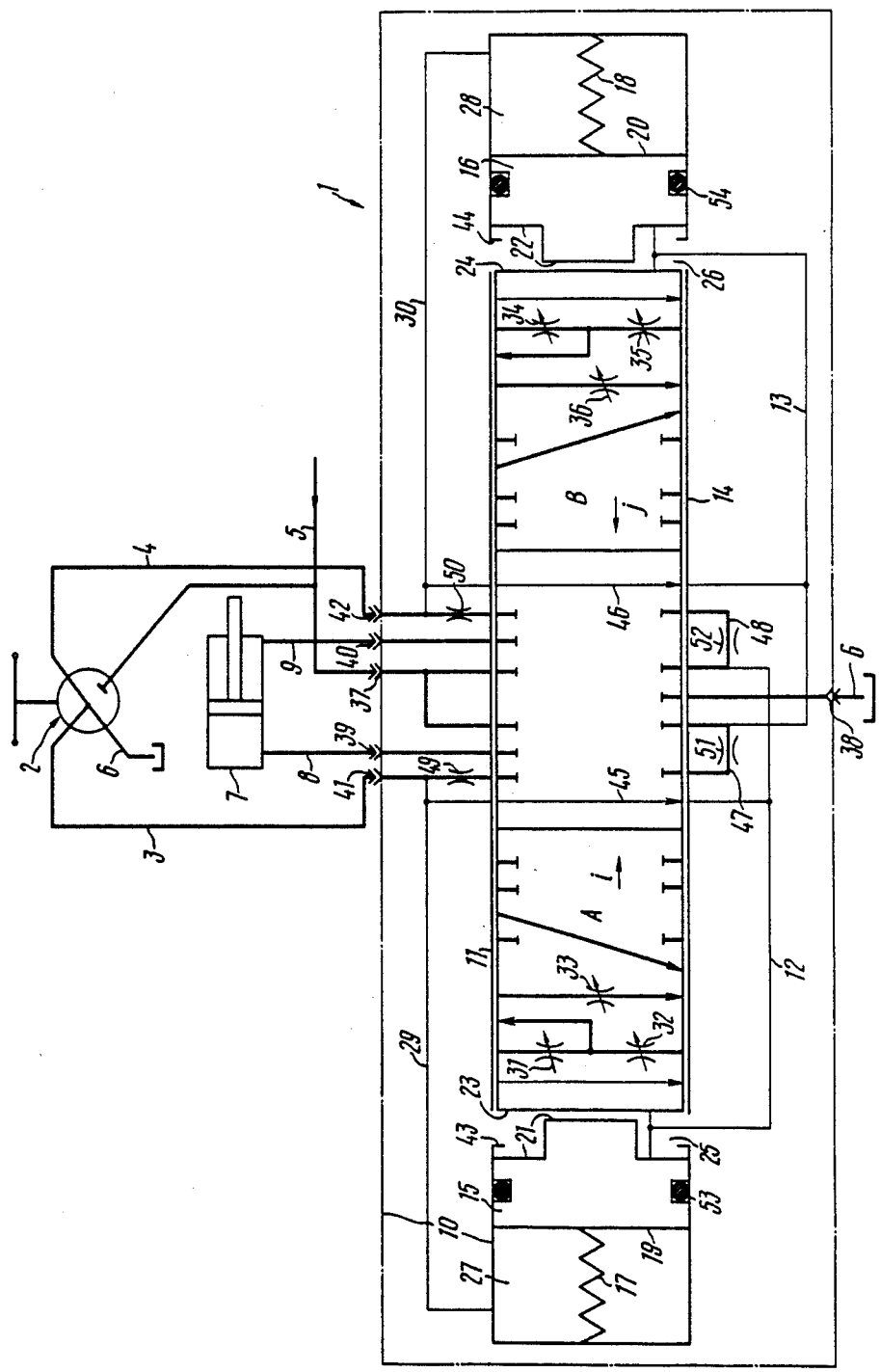

FLOW AMPLIFIER IN HYDRAULIC STEERING SYSTEM OF A TRANSPORT VEHICLE

FIELD OF THE INVENTION

The invention relates generally to transport-vehicle manufacturing industry, more specifically, to hydraulic steering systems of wheeled vehicles, and has particular reference to flow amplifiers (or intensifiers) used in hydraulic steering systems of transport vehicles.

Flow amplifiers are applied in hydraulic steering systems of heavy-duty vehicles in a set with a hydraulically operated steering wheel unit, a steering unit of the metering-out type that effects proportioned feed of the hydraulic fluid to a consumer, in a given particular case, to a flow intensifier, in a direct ratio with the degree of the steering gear shaft angular displacement. Such systems make it possible to utilize high power capacities of the steering system despite small size and mass characteristics of a hydraulically operated steering wheel unit and also to provide for a proportional travel of the rod of a hydraulic actuating cylinder with respect to the amount of angular displacement of the steering gear shaft.

BACKGROUND OF THE INVENTION

One prior-art flow amplifier (cf. U.S. Pat. No. 4,356,759, Cl. B62D 5/08, 1982) is known to comprise a three-position hydraulically operated spool-type directional control device and a flow intensification system incorporating three variable flow restrictors or chokes. The directional control device is in fact a hydraulic directional control valve involving two sliding spool valves of which one is a reversing and the other, a regulating one. The reversing spool valve is a three-position one and effects alteration of the direction of flows in the hydraulic lines of the actuating hydraulic cylinder and in the internal hydraulic pilot lines of the directional control valve. The regulation spool valve provides for precise operation of the flow amplifier.

Flow intensification is attained due to an outside power source using the principle of a throttle or restrictive control, that is, maintaining the same differential pressure on both of the flow restrictors, of which the one having a smaller restriction area (the pilot restrictor) is supplied along the hydraulic pilot lines of the hydraulically operated steering wheel, while the other one having a larger restriction area (the intensifying restrictor), is supplied from an outside power source. The same differential pressure on both of the flow restrictors is maintained by changing the restriction area of a third (regulating) flow restrictor interposed between the external power source and the intensifying flow restrictor. The regulating flow restrictor is essentially a metering or throttling land of the regulating spool valve provided in the hydraulic pressure line of the outside power source before the inlet of the intensifying flow restrictor. Each of the end chambers of the regulating spool valve confined within its ends and the sleeve walls, communicates with the input of the respective pilot or intensifying flow restrictor. Then a total (amplified) flow from the pilot and intensifying restrictors is admitted to the reversing spool valve and further on to the actuating hydraulic cylinder of the system, whereupon the hydraulic fluid is expelled, from the opposite chamber of said cylinder, into the return line to be drained back into the tank.

However, the aforediscussed known flow amplifier suffers from too low operating precision on low-rate flows and high power losses on high-rate flows, a disadvantage accounted for by the fact that no automatic control of the restriction areas of the pilot and intensifying flow restrictors is provided in response to a change in the rate (or intensity) of flow; in addition, the flow amplifier in question suffers from inadequate operating reliability, too high specific metal content, as well as technological and constructional complicacy due to the provision of a two-spool valve directional control device.

Known in the present state of the art is also a flow amplifier in the hydraulic steering system of a transport vehicle (cf. a prospectus of Danfoss Co., Denmark, No. 6/82-02, 1982), featuring the same constructional arrangement as described hereinabove, i.e., it comprises a three-position hydraulically operated spool-type directional control device incorporating two sliding spool valves, a regulating and a valving (directional-control), and internal hydraulic pilot lines. The housing of the flow amplifier has a number of external portholes adapted for communicating the internal hydraulic pilot lines with the hydraulic power lines (i.e., pressure, return (exhaust), and cylinder supply lines) of the hydraulic steering system, and with its two external hydraulic pilot lines. The flow amplification circuit incorporates three variable flow restrictors or chokes, viz., a regulating, an intensifying, and a pilot one, which are provided in the regulating spool valve of the three-position hydraulically operated spool-type directional control device with a possibility of varying their restriction areas along the direction of the sliding spool valve travel.

The aforegiven constructional arrangement of the flow amplifier provides for an automatic control of the restriction areas in the pilot and intensifying flow restrictors in response to a change in the flow intensity. This is attained due to the fact that the flow restrictors are in fact the throttling lands of the regulating spool valve whose position and hence the opening of the pilot and intensifying flow restrictors, depends on the intensify of the hydraulic fluid flow. This makes it possible to maintain adequate operating precision of the flow amplifier on low-intensity flows and to minimize power losses when operating on high-intensity flows. However, inherent in the aforediscussed constructional arrangement of the flow amplifier are such disadvantages as too low operating reliability, high specific metal content, as well as technological and constructional complicacy due to the provision of a two-spool valve three-position hydraulically operated spool-type directional control device.

SUMMARY OF THE INVENTION

The object of the present invention is to provide higher operating-reliability, to reduce specific metal content and to render the flow amplifier in the hydraulic steering system of a transport vehicle less complicated both technologically and constructionally.

Said object is accomplished due to the fact that in a flow amplifier of the hydraulic steering system of a transport vehicle, comprising a three-position hydraulically operated spool-type directional control device having internal hydraulic pilot lines, which are connected, when in the crossover (neutral) position, to external port-holes made in the sleeve of said device to communicate it with external hydraulic pilot lines of the steering system, an intensifying choke, a regulating choke, and a pilot choke which are provided in the sliding spool valve of said three-position hydraulically operated spool-type directional control device with a possibility of varying their restriction areas along the direction of the sliding spool travel, according to the invention, said three-position hydraulically operated spool-type directional control device is in fact a three-position hydraulically operated single-spool hydraulic directional control valve provided with two plungers spring-loaded on their outside end faces, two internal hydraulic pilot lines of said plungers, each of said lines communicating with the respective external porthole, and additionally provided a pilot choke, an intensifying choke and a regulating choke, which are made in the sliding spool valve with a possibility of varying their restriction areas along the direction of the sliding spool valve travel, each of the plungers being axially traversable for its inside end face to interact with the respective end face of the sliding spool valve when the three-position hydraulically operated single-spool hydraulic directional control valve is in the crossover position, while one of the internal hydraulic pilot lines is communicable with the input of the intensifying flow restrictor when the three-position hydraulically operated single-spool hydraulic directional control valve is in the operating position.

It is expedient that the flow amplifier, according to the invention, be provided with four correction or compensation flow restrictors or chokes, of which two should be located upstream of the inputs of the pilot chokes, and two other, upstream of the inputs of the intensifying chokes.

In the flow amplifier under consideration, the directional control device is in fact a three-position hydraulically operated single-spool hydraulic directional control valve provided with three pairs of variable flow restrictors or chokes (i.e., pilot, intensifying and regulating chokes, a pair of each type), which are capable of varying their restriction areas in the direction of the sliding spool valve travel, as well as with two plungers which establish two additional control chambers confined between said plungers and the valve sleeve. The plungers cause the sliding spool valve to travel from the crossover position to the operating position, and vice versa, depending on the direction of the hydraulic fluid flow in the external hydraulic pilot lines. Once the sliding spool has been shifted to the operating position, the plungers assume the position corresponding to a complete releasing of the sliding spool valve from their action, while one of the sliding spool valve control chambers is disconnected from the external hydraulic pilot line and gets connected to the input of the intensifying choke. Thus, the sliding spool valve starts performing the regulating functions. Inasmuch as the plungers do not affect the regulation process under such operating conditions, they can be installed in the sleeve with rather great diametral clearances packed with rubber or polymer seals, which proves to be a simple procedure both from constructional and technological viewpoints since the springs of the plungers that actuate the sliding spool valve to return to the crossover position, can be accommodated inside the plungers within their linear dimensions, thus not increasing the overall dimensions of the proposed flow amplifier. On the other hand, dispensing with another sliding spool valve in the constructional arrangement of the flow amplifier enables one to substantially simplify its construction and production process, increase its operating reliability, as well as to reduce its overall dimensions and mass as compared with the two-sliding spool valve construction of the flow amplifier, with the operating precision and low power losses remaining unaffected.

BRIEF DESCRIPTION OF THE DRAWINGS

In what follows the invention is illustrated by the accompanying drawing representing a schematic diagram of a flow amplifier in the hydraulic steering system of a transport vehicle, according to the invention.

DETAILED DESCRIPTION OF THE INVENTION

A flow amplifier 1 is installed in a hydraulic steering system, comprising a hydraulically operated steering wheel 2 provided with external hydraulic pilot lines 3 and 4, a hydraulic pressure line 5 and a hydraulic return line 6, as well as an actuating hydraulic cylinder 7 provided with hydraulic communicating lines 8 and 9. The pressure line 5, the return line 6 and the hydraulic cylinder communicating lines 8 and 9 are in effect hydraulic power lines. The flow amplifier 1 comprises a three-position hydraulically operated spool-type directional control device 11 enclosed in a sleeve 10. The aforesaid device is in fact a three-position hydraulically operated single-spool hydraulic directional control valve provided with internal hydraulic pilot lines 12, 13 and one sliding spool valve 14, as well as with plungers 15 and 16 which are loaded with springs 17, 18 on their outside end faces 19, 20. The sliding spool valve can assume any of the three positions corresponding to its position in the sleeve 10, i.e., crossover (central) position, and two operating positions (which are the extreme positions in FIG.1).

The plungers 15 and 16 define control chambers 25, 26 of the sliding spool valve 14, said chambers being confined between inner end faces 21, 22 of the plungers 15, 16, the sleeve 10, and end faces 23, 24 of the sliding spool valve 14 and being connected to the internal hydraulic pilot lines 12, 13. Besides, control chambers 27, 28 of the plungers 15, 16 are established by outer end faces 19, 20 thereof and by the sleeve 10, said control chambers being connected to internal hydraulic pilot lines 29, 30 of the plungers 15, 16. The flow amplifier 1 incorporates also a pilot choke 31, an intensifying choke 32 and a regulating choke 33, as well as additionally provided a pilot choke 34, an intensifying choke 35 and a regulating choke 36, all of said chokes being made in the body of the sliding spool valve 14 as throttling or metering lands (omitted in the Drawing). The sleeve 10 has a plurality of external portholes adapted for communication with the hydraulic power lines, viz., an external porthole 37 for connection to the hydraulic pressure line 5, an external porthole 38 (shown at the bottom of the Drawing) for connection to the hydraulic return line 6, and external portholes 39, 40 for connection to the hydraulic communicating lines 8, 9. Another two external portholes 41, 42 are provided in the sleeve 10 to communicate with the external hydraulic pilot lines 3, 4 of the steering system. The plungers 15, 16 with their inner end faces look towards the end faces 23, 24 of the sliding spool valve 14 and are axially traversable for interacting with said end faces 23, 24. The travel of the plungers 15, 16 towards the end faces 23, 24 of the sliding spool valve 14 is limited by stops 43, 44 whose position determines the crossover position of the sliding spool valve 14.

The pilot chokes 31 and 34 are for control of the position assumed by the sliding spool valve 14 for the hydraulic fluid to pass from the external hydraulic pilot lines 3 and 4 to the actuating hydraulic cylinder 7. The intensifying chokes 32, 35 are for flow amplification in ratio with the flow passing through the pilot chokes 31, 34 and for the hydraulic fluid to pass to the actuating hydraulic cylinder 7. The regulating chokes 33 and 36 are for establishing the same pressure at the input of the intensifying chokes 32, 35 and at the input of the pilot chokes 31, 34 to provide linearity of the flow characteristics of the flow amplifier 1. With the sliding spool valve 14 in the crossover position, the control chambers 25, 26 of the spool valve 14 communicate with the external portholes 41, 42 via the internal hydraulic pilot lines 12, 13 of the sliding spool valve 14 and internal hydraulic lines 45, 46. The control chambers 27, 28 of the plungers 15, 16 communicate with the external portholes 41, 42 through the hydraulic lines 29, 30. The pressure line 5, the cylinder communicating lines 8, 9 and the return line 6 are blocked by the regulating lands of the sliding spool valve 14.

For the sake of explanation of intercommunications taking place in the working position (e.g., the left-hand one), let us transfer the left-hand portion "A" of the drawing to its centre along the arrow "i". Thence the chambers 27, 25 are connected, as before, to the external porthole 41 along the internal hydraulic lines 29 and 12, 45 respectively, while the chamber 28 is connected to the external porthole 42 through the internal hydraulic line 30. In this case the internal hydraulic line 46 is open, whereby the control chamber 26 of the sliding spool valve 14 is connected only to the input of the intensifying choke 32 through the internal hydraulic lines 13, 47.

Connected to the external porthole 41 is also the input of the pilot choke 31 whose output is connected to the output of the intensifying choke 32 and to the external porthole 39. The external porthole 40 is connected to the external porthole 38. The hydraulic pressure line 5 is connected to the input of the intensifying choke 32 via the external porthole 40, the regulating choke 33 and the hydraulic line 47.

Upon transferring the right-hand portion "B" of the drawing to its centre along the arrow "j", in the right-hand working position of the flow amplifier, the chambers 28, 26 communicate with the external porthole 42 through the internal hydraulic lines 30 and 13, 46 respectively, while the control chamber 27 of the plunger 15 communicates with the external porthole 41 along the internal hydraulic line 29. Since the internal hydraulic line 45 is open in this case, the control chamber 25 of the sliding spool valve 14 is connected only to the input of the intensifying choke 35 through the internal hydraulic lines 12, 30. Connected to the external porthole 42 is also the input of the pilot choke 34 whose output is connected to the output of the intensifying choke 35 and to the external porthole 40. The external porthole 39 is connected to the external porthole 38, while the hydraulic pressure line 5 is connected to the input of the intensifying choke 35 via the external porthole 40, the regulating choke 36 and the hydraulic line 48.

The flow amplifier 1 is also provided with four correction or compensation chokes of which chokes 49 and 50 are installed before the inputs of the pilot chokes 31 and 34, respectively, while two other correction chokes 51, 52 are situated before the input of the intensifying choke 32 on the internal hydraulic line 47, and before the input of the intensifying choke 35 on the internal hydraulic line 48, respectively.

The plungers 15, 16 are installed in the sleeve 10 with rather great diametral clearances, which are packed with seals 53, 54 made of, e.g. rubber.

The flow amplifier 1 in the hydraulic steering system of a transport vehicle operates as follows.

Since when in the initial position all the control chambers 25, 26, 27, 28 are under the same pressure, the plungers 15, 16 are actuated by their respective springs 17, 18 to travel until meeting the respective stops 43, 44, thus shifting, with their respective inner end faces 21, 22, the sliding spool valve to the crossover (central) position, wherein all the hydraulic power lines, i.e., the pressure line 5, the return line 6 and the hydraulic cylinder communicating lines 8 and 9 are blocked. Once the hydraulically operated steering wheel unit has been turned, the hydraulic pressure line 5 gets connected, in the hydraulically operated steering wheel 2, to one of the external hydraulic lines 3 and 4, depending on the direction of turn of the hydraulically operated steering wheel 2, while the other of said internal hydraulic lines is connected to the hydraulic return line 6. As a result, the pressure balance in the control chambers 25, 26 of the sliding spool valve 14, as well as that in the control chambers 27, 28 of the plungers 15, 16 is disturbed. With the hydraulically operated steering wheel 2 turned in a direction corresponding to intercommunication of the hydraulic pressure line 5 with the hydraulic line 6 and intercommunication of the hydraulic line 4 with the hydraulic return line 6, there occurs initial travel of the sliding spool valve 14 and the plunger 16 to the right as along the arrow "i" in the Drawing, since the control chambers 26 and 28 are connected, through the internal hydraulic lines 30, 13 and 46, 4, to the hydraulic return line 6, while the control chambers 25 and 27 are under the operating pressure admitted to them along the internal hydraulic lines 29, 45 and 3, 5. In this case the plunger 15 is retained, by the spring 17, in the same position as before, since no differential pressure is effective in the chambers 25 and 27. With further displacement of the sliding spool valve 14 along the arrow "i" to its left-hand working position, the internal hydraulic line 46 is blocked, and the hydraulic fluid flow passes from the hydraulically operated steering wheel 2 along the hydraulic pressure line 3 to the input of the pilot choke 31 and, on passing there-through, is admitted to the hydraulic cylinder communicating line 8 and to the actuating hydraulic cylinder 7, whence the hydraulic fluid flows along the hydraulic communicating line 9 to the hydraulic return line 6. At the same time the main flow of the hydraulic fluid is directed from the source of hydraulic fluid (not shown) along the hydraulic pressure line 5 and through the regulating choke 33, to the input of the intensifying choke 32 and, on passing therethrough, is also admitted to the actuating hydraulic cylinder 7. Inasmuch as, with the sliding spool valve 14 in the position under consideration, the input of the intensifying choke 32 communicates, via the hydraulic lines 47 and 13, with the chamber 26 (with the hydraulic line 46 open), and the chamber 28 communicates with the hydraulic return line, the plunger 16 is urged to travel to the rightmost position. In this case, the sliding spool valve 14 remains in the balanced position due to the pressure effective in the chamber 25 and corresponding to the inlet pressure of the pilot choke 31 (hydraulic lines 12 and 45) and under the action of the pressure effective in the chamber 26 and corresponding to the inlet pressure of the intensifying choke 32 (hydraulic lines 13 and 49). Thus, the pressure in the chamber 25 is equal to the sum of the externally applied load and of the pressure losses on the pilot choke 31, while the pressure in the chamber 26 is also equal to the sum of the externally applied load and of the pressure losses on the intensifying choke 32.

Since the pilot choke 31 and the intensifying choke 32 have their outputs joined together, so the linearity of the flow characteristics of the flow amplifier 1 can be attained by merely maintaining a pressure at the input of the pilot choke 32 equal to the inlet pressure of the pilot choke 31. In this case, the hydraulic fluid flow admitted to pass to the actuating hydraulic cylinder 7 is equal to:

$$Q_1 = Q_2 + Q_3$$

$$Q_2 = \frac{F}{f} = Q_3$$

$$Q_1 = kQ_3, k = \frac{F}{f} + 1,$$

where:
Q₁—summary flow of hydraulic fluid admitted to the actuating hydraulic cylinder 7 through both of the chokes 31 and 32;
Q₂—flow of hydraulic fluid admitted to the actuating hydraulic cylinder 7 through the intensifying choke 32;
Q₃—flow of hydraulic fluid admitted to the actuating hydraulic cylinder 7 from the hydraulically operated steering wheel 2 through the pilot choke 31;
F—restriction area of the intensifying choke 32;
f—restriction area of the pilot choke 31;
k—flow gain of the flow amplifier 1.

The higher the ratio of F/f the larger the flow gain of the flow amplifier 1. The pressure balance at the inputs of the chokes 31 and 32 is maintained by virtue of an automatic control of the degree of opening of the restriction area of the choke 33 and hence of the rate of fluid flow passing to the choke 32. As soon as the shaft of the hydraulically operated steering wheel 2 starts rotating at a higher speed, the rate of fluid flow along the hydraulic pressure line 3 increases and hence rises the inlet pressure of the pilot choke 31 and the pressure in the chamber 25. As a result, the sliding spool valve 14 changes its position, thus opening all the three chokes, i.e., the pilot choke 31, the intensifying choke 32, and the regulating choke 33 and thereby increasing the rate of fluid flow admitted to pass through the regulating choke 33 to the intensifying choke 32 and hence increasing the pressure at the input of the intensifying choke 32 and in the chamber 26. Since an increase in the rate of fluid flow admitted to the actuating hydraulic cylinder 7 is followed by an automatic shifting of the sliding spool valve 14 to open all the chokes 31, 32, 33 waste of pressure spent for the regulating process is but insignificant.

Upon reversal of the shaft of the hydraulically operated steering wheel 2 the flow amplifier 1 operates in a similar way as described before, with the sole exception that engaged in operation are the other chokes, i.e., the intensifying choke 35, the pilot choke 34 and the regulating choke 36.

With a view to attaining higher precision of its operation the flow amplifier 1 incorporates also the correction chokes 49, 50, 51 and 52 adapted to compensate for unaccounted pressure losses occurring in the passageways of the flow amplifier 1.

The proposed invention makes it possible to considerably simplify the construction of the flow amplifier 1 and reduce its specific metal content, as well as increase its operating reliability due to the provision of the hydraulically operated spool-type directional control device 11 as hydraulically operated single-spool hydraulic directional control valve provided with the plungers 15, 16, though these plungers do not increase the overall dimensions of the hydraulic directional control valve. Incorporation of additional chokes into the constructional arrangement, of the sliding spool valve 14, i.e., the intensifying choke 35, the pilot choke 34 and the regulating choke 36 enables the flow amplifier to operate in both modes using the same sliding spool valve 14.

What is claimed is:
1. In a hydraulic steering system of a transport vehicle having a flow amplifier, said flow amplifier comprising:
a three-position hydraulically operated spool-type directional control device made as a three-position hydraulically operated single-spool hydraulic directional control valve provided with internal hydraulic pilot lines;
a sleeve of said three-position hydraulically operated hydraulic directional control valve;
said spool valve having end faces and capable of assuming, in the course of travelling in said sleeve, the crossover (central) position, or two operating positions according to its position in said sleeve of the three-position hydraulically operated hydraulic directional control valve;
external portholes made in said sleeve of the three-position hydraulically operated hydraulic directional control valve and adapted for communication with external hydraulic pilot lines of said hydraulic steering system;
said internal hydraulic pilot lines connected, when in said crossover position, to said external portholes;
a first and a second pilot choke adapted for control of the position assumed by said spool valve and for passing the pilot flow of hydraulic fluid from aforesaid hydraulic pilot lines to said power hydraulic lines of the hydraulic steering system;
a first and a second intensifying choke adapted for passing additional amplified flows of hydraulic fluid;
a first and a second regulating choke adapted for maintaining equal differential pressure on said pilot and intensifying chokes;
said first and second pilot, intensifying and regulating chokes made in said sliding spool valve with a possibility of varying their restriction areas along the direction of travel of said sliding spool valve;
said hydraulically operated hydraulic directional control valve provided with two plungers having outside and inside end faces, and with two internal hydraulic pilot lines for said plungers;
said plungers spring-actuated on said outside end faces thereof;
said internal hydraulic pilot lines of said plungers, communicating with said respective external portholes for connection to said external hydraulic pilot lines of the hydraulic steering system;
each of said plunger axially traversable for interacting, through said inside end face thereof, with said respective end face of said sliding spool valve;

one or the other of said internal hydraulic pilot lines disconnected from said respective external porthole and connected to the input of the first or second intensifying choke in one or the other of the operating positions of said sliding spool valve, respectively.

2. A flow amplifier as claimed in claim 1, comprising four correction chokes;
   two of said correction chokes located before the inputs of said pilot chokes;
   the other two of said correction chokes situated before the inputs of said intensifying chokes.

* * * * *